(12) United States Patent
Caparros

(10) Patent No.: US 6,684,899 B2
(45) Date of Patent: Feb. 3, 2004

(54) APPARATUS FOR SAFELY CONTAINING AND DELIVERING HAZARDOUS FLUID SUBSTANCES FROM AT LEAST TWO SUPPLY CYLINDERS

(76) Inventor: Rudolph Caparros, 3641 Turnberry Cir., Santa Rosa, CA (US) 95430

( * ) Notice: Subject to any disclaimer, the term of this patent is extended or adjusted under 35 U.S.C. 154(b) by 235 days.

(21) Appl. No.: 09/939,918

(22) Filed: Aug. 27, 2001

(65) Prior Publication Data

US 2003/0037816 A1 Feb. 27, 2003

(51) Int. Cl.[7] ................................................. F17D 1/00
(52) U.S. Cl. ........................ 137/266; 137/264; 137/259
(58) Field of Search ................................. 137/266, 259, 137/264, 263

(56) References Cited

U.S. PATENT DOCUMENTS

| | | | | |
|---|---|---|---|---|
| 4,376,489 A | * | 3/1983 | Clemens | 137/264 |
| 5,469,701 A | * | 11/1995 | Sneddon et al. | 137/264 |
| 5,569,151 A | * | 10/1996 | Karwacki et al. | 137/264 |
| 5,607,384 A | * | 3/1997 | Caparros | 588/259 |
| 5,819,787 A | * | 10/1998 | Caparros | 137/377 |

* cited by examiner

*Primary Examiner*—Kevin Lee
(74) *Attorney, Agent, or Firm*—Krank L. Kubler

(57) ABSTRACT

An apparatus for safely delivering a hazardous fluid substance to a receiving structure includes first and second supply cylinders containing the fluid substance and each supply cylinder having a supply cylinder release port; a high pressure containment vessel having a vessel wall and being sized to receive and safely enclose the first and second supply cylinders; a high pressure first tube extending from each of the first and second supply cylinders, and in fluid communication with the supply cylinder release ports and extending to and being in fluid communication with a vessel port in the vessel wall; and a vessel valve in fluid communication with each of the first tube for controlling delivery of the fluid substance from the first and second supply cylinders and from the vessel.

10 Claims, 4 Drawing Sheets

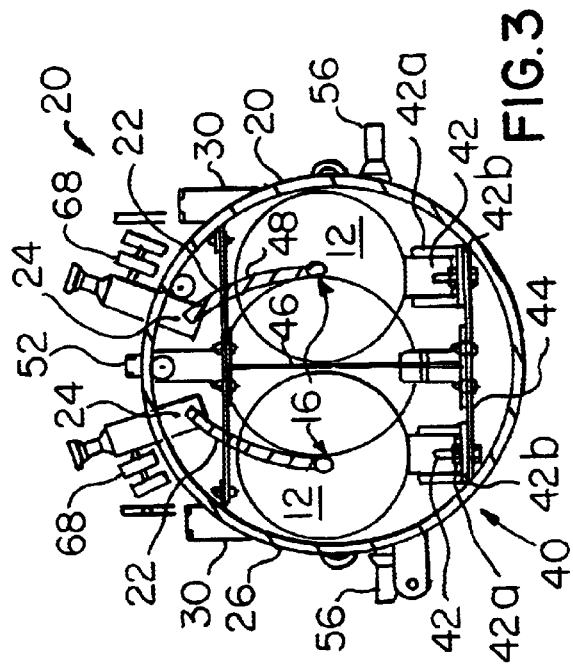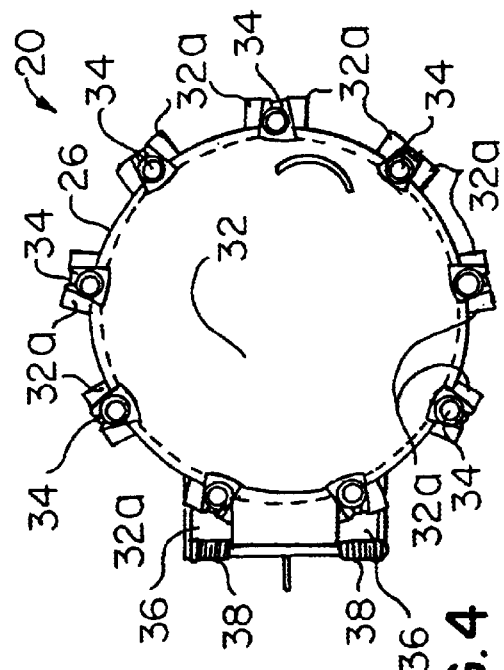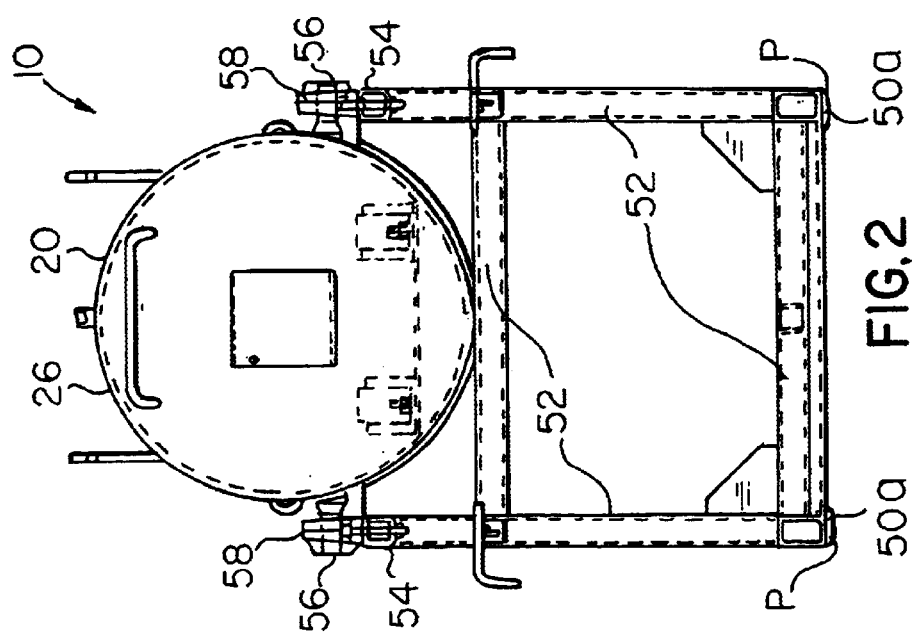

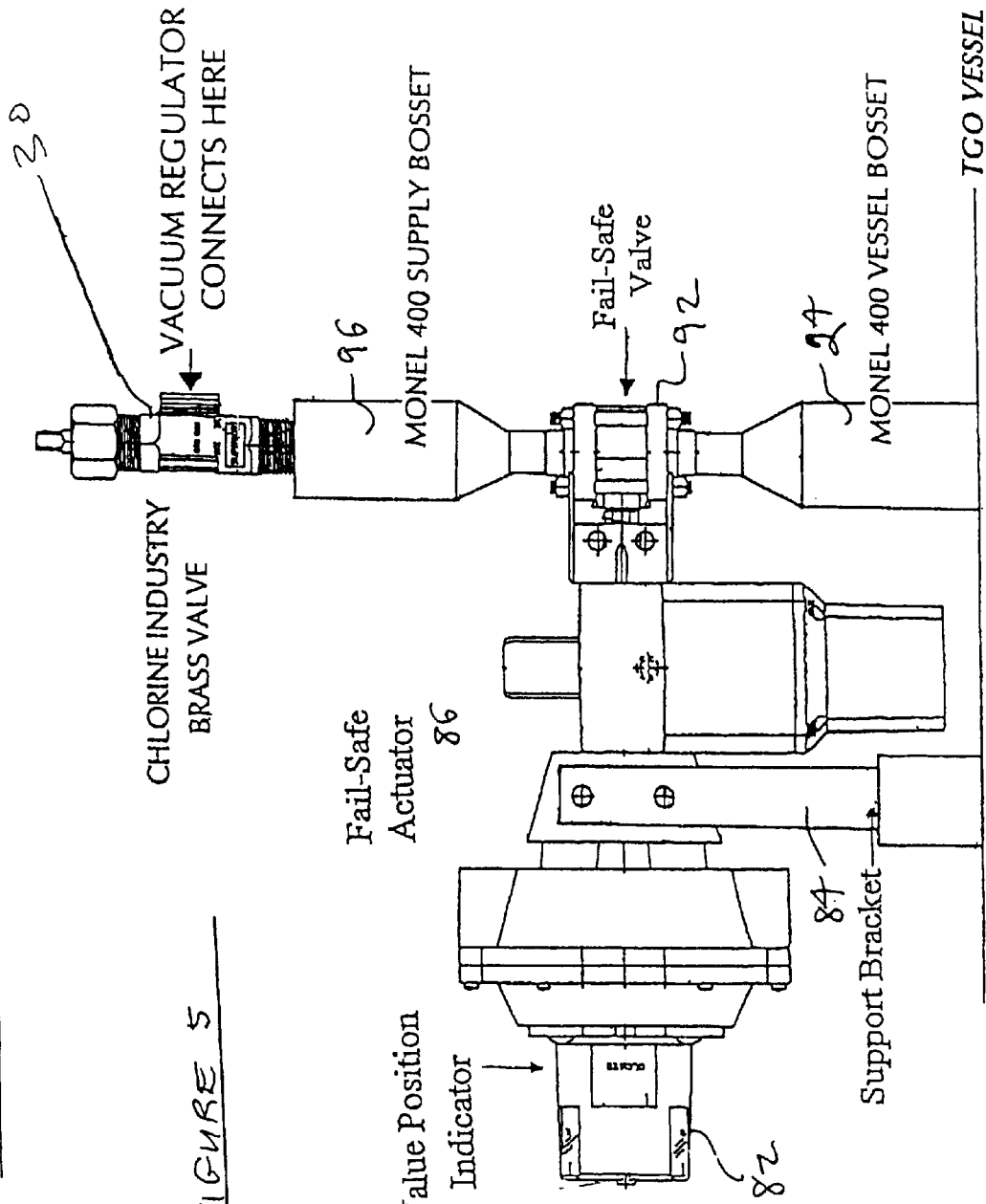

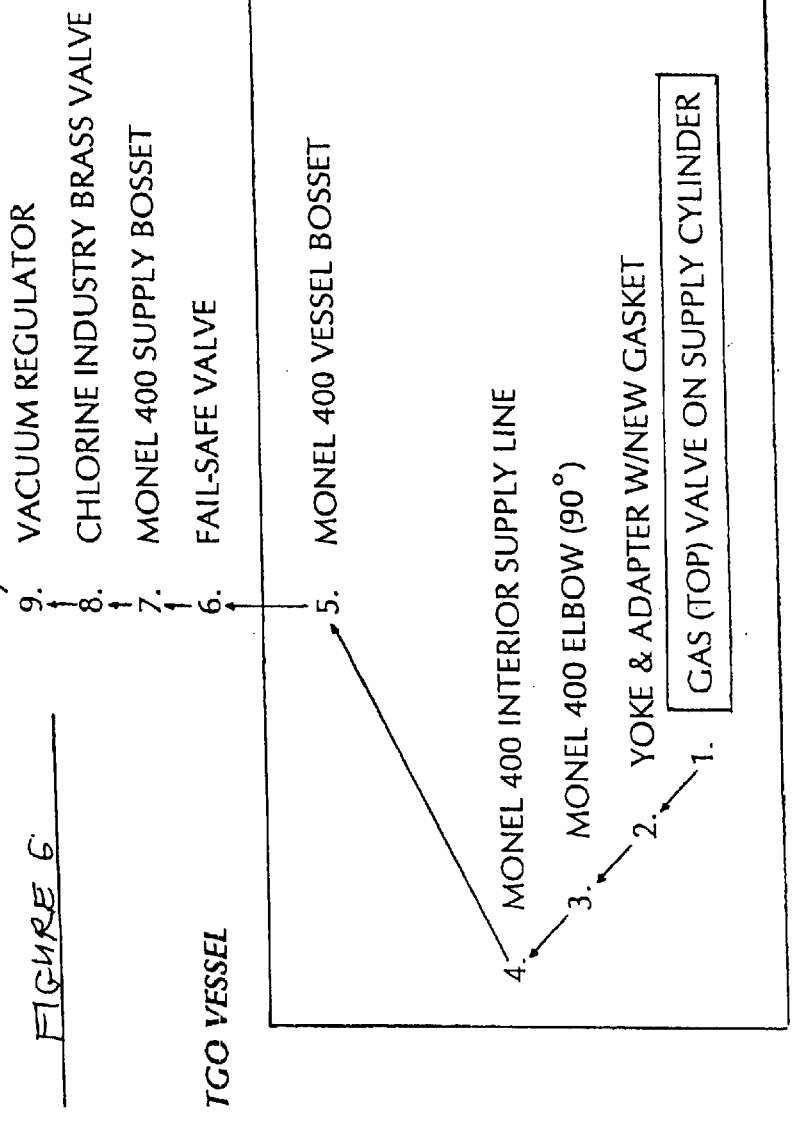

APPARATUS FOR SAFELY CONTAINING AND DELIVERING HAZARDOUS FLUID SUBSTANCES FROM AT LEAST TWO SUPPLY CYLINDERS

BACKGROUND OF THE INVENTION

1. Field of the Invention

The present invention relates generally to the field of chemical gas and liquid containment and delivery systems. More specifically, the present invention relates to an apparatus and process for safely secondarily containing at least two supply cylinders containing a hazardous fluid substance and delivering the hazardous fluid substance such as chlorine gas from the supply cylinders either simultaneously or sequentially, to a receiving structure or system, such as to one or more distribution cylinders or to a pool chlorine gas treatment system in accordance with government regulations. These regulations specifically include Toxic Gas Ordinance No. 23450, Chapter 17.78 of the San Jose Municipal Code, and the Uniform Fire Code, Article 20, Hazardous Materials.

The apparatus includes a high pressure containment vessel for receiving and safely enclosing a plurality of, and preferably two, supply cylinders each having a release valve and containing a hazardous fluid substance at a pressure above ambient. The containment vessel contains a cylinder support structure for supporting the at least two supply cylinders on support rollers so that the supply cylinders can be rolled into and out of the containment vessel. A high pressure flex line or rigid pipe fitting extends from each supply cylinder release valve to one of two automatic gas sensing valve assemblies mounted in a vessel port in the vessel wall for the specific supply cylinder. A gas sensing valve assembly is provided on each release valve and automatically shuts off the flow of gas through the given vessel port when a gas leak is detected outside the containment vessel. Chlorine gas passes through each valve assembly and into a receiving structure or system, such as a gas manifold having coupling ports to which one or more distribution cylinders, also known as service cylinders, are removably connected. A back-up, manually operated valve is also provided in series with each automatic gas sensing valve assembly. Each gas sensing valve assembly has a fail-safe-to-close design and the back-up valve is fitted with quick-turn lever handled Hastaloy™ "C" ball valves. The sensing and back-up valves both have reduced-orifice controllers. A containment vessel support structure is provided having a vessel pivot assembly so that the vessel can be tilted back, causing liquid chlorine within the contained cylinders to flow to the bottom of the cylinders and away from cylinder release valves. The cylinders are loaded into the vessel while the vessel is horizontal, but have to be oriented at an angle, preferably at 45 degrees, to drain gas rather than liquid. The containment vessel has a spring-loaded vessel lid biased by lid springs to an open position to aid in opening the vessel lid when the vessel is tilted back, and door sealing means are provided.

To meet secondary containment requirements, the gas manifold is enclosed within an exhausted enclosure connected to a gas scrubbing unit. The scrubbing unit is substantially smaller than scrubbers typically used in the industry, because most of the gas is automatically sealed within the supply cylinders by the sensing valve assembly and within any distribution cylinders by a reduced orifice flow controller on the manifold coupling ports. Should one or both of the supply cylinders leak, the gas then contain may be released into the scrubbing unit at a very low rate, and alternatively may be released instead into at least one gas cylinder rather than scrubbed and wasted.

The delivery process is inventively passive, so that dependence upon electric power for safe containment and flow is eliminated. The process includes the steps of placing two supply cylinders into a containment vessel; and connecting the supply cylinder release valves to respective tubing means extending through fluid substance sensing valve assemblies in the vessel wall. Optional additional steps include delivery of the fluid substance from the gas sensing valve assemblies into a gas manifold; and delivering the gas from the manifold into a distribution cylinder. Fluid substance contained within the supply vessel and gas manifold is maintained at ambient temperature so that gas pressure is minimized for safe retention.

2. Description of the Prior Art

There have long been gas delivery and transfer systems for delivering hazardous fluid substances from a supply cylinder, which is typically a one ton cylinder, into a receiving structure or system, such as a distribution cylinder, which is typically a fifteen or twenty pound cylinder. Government environmental and safety regulations have required that delivery or transfer take place within secondary containment. This has been accomplished in the chlorine industry in several ways.

One way has been to make the transfer in a room filled with massive and very costly scrubber equipment, so that if a leak develops, all gas in the supply cylinder can be very rapidly scrubbed from the air. This process makes it necessary to shut down operation in the room for one or more days and also results in the loss of all chlorine in the supply cylinder, both of these consequences being very expensive in addition to the cost of the scrubbing equipment. Should leakage take place during a power outage, particularly during a natural disaster, the scrubbing equipment would not function, so that the dangerous chlorine gas would escape into the neighborhood and into nearby ecosystems.

Another way of transferring chlorine gas has been with the use of what is known as a "coffin", which is essentially an ordinary sheet metal cabinet. The supply cylinder and distribution cylinder are both placed inside the coffin. The coffin has a release port opening into a powerful suction and scrubber assembly. In the event of supply cylinder leakage, the scrubber assembly must be activated immediately to rapidly draw away all of the escaping gas which includes the entire contents of the supply cylinder. The coffin would not contain the gas in the event that a power failure shut down the scrubber. Thus the problems of the scrubbing room are substantially presented by the coffin and scrubber containment system. Containment buildings and hoods are not capable of withstanding the pressure and corrosive nature of suddenly released quantities of chlorine gas.

Yet another and highly improved way, invented by the present applicant, has involved secondarily containing a supply cylinder within a high pressure vessel and gradually draining off the chlorine gas it contains. In the event of supply cylinder catastrophic failure, the secondary containment vessel retains the gas indefinitely and safely until it can be drained into secure vessels or scrubbed. See Caparros, U.S. Pat. No. 5,607,384, issued on Mar. 4, 1997 and U.S. Pat. No. 5,819,787, issued on Oct. 13, 1998, the contents of which are incorporated by reference. A problem with this approach has been that only one supply cylinder can be contained and drained at a time for each containment vessel.

Other prior references include Van Valkenburgh, et al., U.S. Pat. No. 5,511,908, issued on Apr. 30, 1996 and Payne, et al., U.S. Pat. No. 5,735,639, issued on Apr. 7, 1998 which disclose mobile structures providing a form of secondary containment of hazardous gases stored within cylinders inside the mobile structures. These mobile structures are very bulky, and do not provide storage pressure driven evacuation of leaked gas into another primary container.

Cartwright, et al., U.S. Pat. No. 6,006,588, issued on Dec. 28 1999 and McGouran, Jr., U.S. Pat. No. 4,911,326, issued on Mar. 27, 1990, teach secondary containment boxes with removable side walls for receiving toxic gas primary containers. Gas escaping from the primary containers is confined within interstitial spaces between the primary vessel and the surrounding secondary containment box for subsequent release into a detoxifying system (Cartwright) or the secondary containment box is simply "cleaned" (McGouran, Jr., column 4, line 13).

Karwacki, et al., U.S. Pat. No. 5,569,151, issued on Oct. 29, 1996 reveals a secondary containment and scrubbing system. Rather than providing a close-fitting, high pressure secondary container, Karwacki, et al. discloses a secondary container which is "large enough to contain the entire contents of the inner vessel" and also contains means to absorb and scrub leaked gas. Karwacki, et al. appears highly cumbersome and can contain only one supply cylinder at a time.

It is thus an object of the present invention to provide a hazardous fluid substance delivery system which provides the safe secondary containment required by law for multiple supply cylinders for containment with greater economy.

It is another object of the present invention to provide such a system which is compact and which requires minimal shutdown time in the event of a fluid substance leak.

It is another object of the present invention to provide such a system which safely retains any of the fluid substance leaking from one or more of the secondarily contained supply cylinders which has not reached the receiving structure or system, for gradual release into gas cylinders or into a scrubbing unit.

It is another object of the present invention to provide such a system which can release gaseous substances at a slow, controlled rate and thus requires only a small, low capacity and inexpensive scrubbing assembly.

It is still another object of the present invention to provide such a system which safely and secondarily contains the vast majority of leaking fluid substance in a containment vessel in the event of power failure such as during a natural disaster.

It is yet another object of the present invention to provide such a containment vessel, which is mounted to tilt backward so that the supply cylinders are partially upright, causing liquid chlorine within the contained cylinders to flow to the bottom of the cylinders and away from cylinder release valves.

It is still another object of the present invention to provide such a system which automatically stops the flow of fluid substance from the containment vessel with a valve operated by a fluid substance sensing mechanism.

It is finally an object of the present invention to provide such a system which delivers or transfers a fluid substance by passive, low pressure means and which is compact and economical to build and operate.

SUMMARY OF THE INVENTION

The present invention accomplishes the above-stated objectives, as well as others, as may be determined by a fair reading and interpretation of the entire specification.

An apparatus is provided for safely delivering a hazardous fluid substance to a receiving structure, including first and second supply cylinders containing the fluid substance and each supply cylinder having a supply cylinder release port; a high pressure containment vessel having a vessel wall and being sized to receive and safely enclose the first and second supply cylinders; first and second high pressure first tubes extending from the first and second supply cylinders, and in fluid communication with the supply cylinder release port and extending to and being in fluid communication with a vessel port in the vessel wall; and a vessel valve in fluid communication with each of the first tube for controlling delivery of the fluid substance from the first and second supply cylinders and from the vessel. The apparatus preferably additionally includes a cylinder support structure within the containment vessel for supporting the first and second supply cylinders and retaining the supply cylinders against substantial movement within and relative to each other. The cylinder support structure preferably includes a lower lateral cross-plate within the containment vessel and at least two parallel and longitudinally oriented cylinder support rails mounted to the lower lateral cross-plate, the lateral cross-plate being secured at each end to the vessel wall; and a series of support rollers rotatably mounted to the cylinder support rails to support and permit the supply cylinders to roll on the rollers into and out of the vessel.

The vessel valve preferably includes a fluid substance sensing valve assembly mounted at the vessel port, for automatically shutting off the flow of the fluid substance upon detection of the fluid substances outside the containment vessel, for automatically sealing substantially all of the fluid substance contained within the supply cylinder within the containment vessel in the event of an uncontrolled release of the fluid substance outside the containment vessel. The apparatus may additionally include at least one distribution cylinder; where the receiving structure includes a distribution manifold in fluid communication with the tube through which the fluid substance passes, having at least one port to which the at least one distribution cylinder is removably connected, the manifold having a certain manifold internal volume for containing a certain quantity of the fluid substance; an exhausted enclosure enclosing the manifold and being of sufficient internal volume to retain at substantially ambient pressure and temperature the certain quantity of fluid substance contained within the manifold; and a fluid substance scrubbing unit of sufficient capacity to scrub all the fluid substance initially within the supply cylinder at a controlled flow rate through the vessel valve. The vessel valve preferably includes a valve adaptor having a reduced orifice controller.

The apparatus preferably additionally includes a containment vessel support structure including a support frame having two substantially parallel and laterally spaced apart frame side beams, pin bearings secured onto tops of the frame side beams, vessel pins extending laterally from the vessel side wall and through the pin bearings, so that the vessel is pivotable relative to the frame on the vessel pins.

BRIEF DESCRIPTION OF THE DRAWINGS

Various other objects, advantages, and features of the invention will become apparent to those skilled in the art from the following discussion taken in conjunction with the following drawings, in which:

FIG. 2 is an end view of the apparatus of FIG. 1.

FIG. 3 is a cross-sectional end view of the vessel showing the cylinder support rollers and the composite I-beam structure for retaining and segregating two supply cylinders.

FIG. 4 is an end view of the vessel showing the vessel lid, lid securing bolts, lid hinges and lid biasing springs FIG. 5 is a perspective view of the apparatus of FIG. 1 connected to a chlorine delivery manifold shown in broken lines, contained within an exhausted enclosure, and a chlorine distribution cylinder connected to one of two coupling ports on the manifold. FIG. 5a is a front view of the apparatus of FIG. 3, showing fluid piping connections in greater detail.

FIG. 6 is a side view of the preferred sensing valve assembly on the containment vessel.

DETAILED DESCRIPTION OF THE PREFERRED EMBODIMENTS

Figure 1:
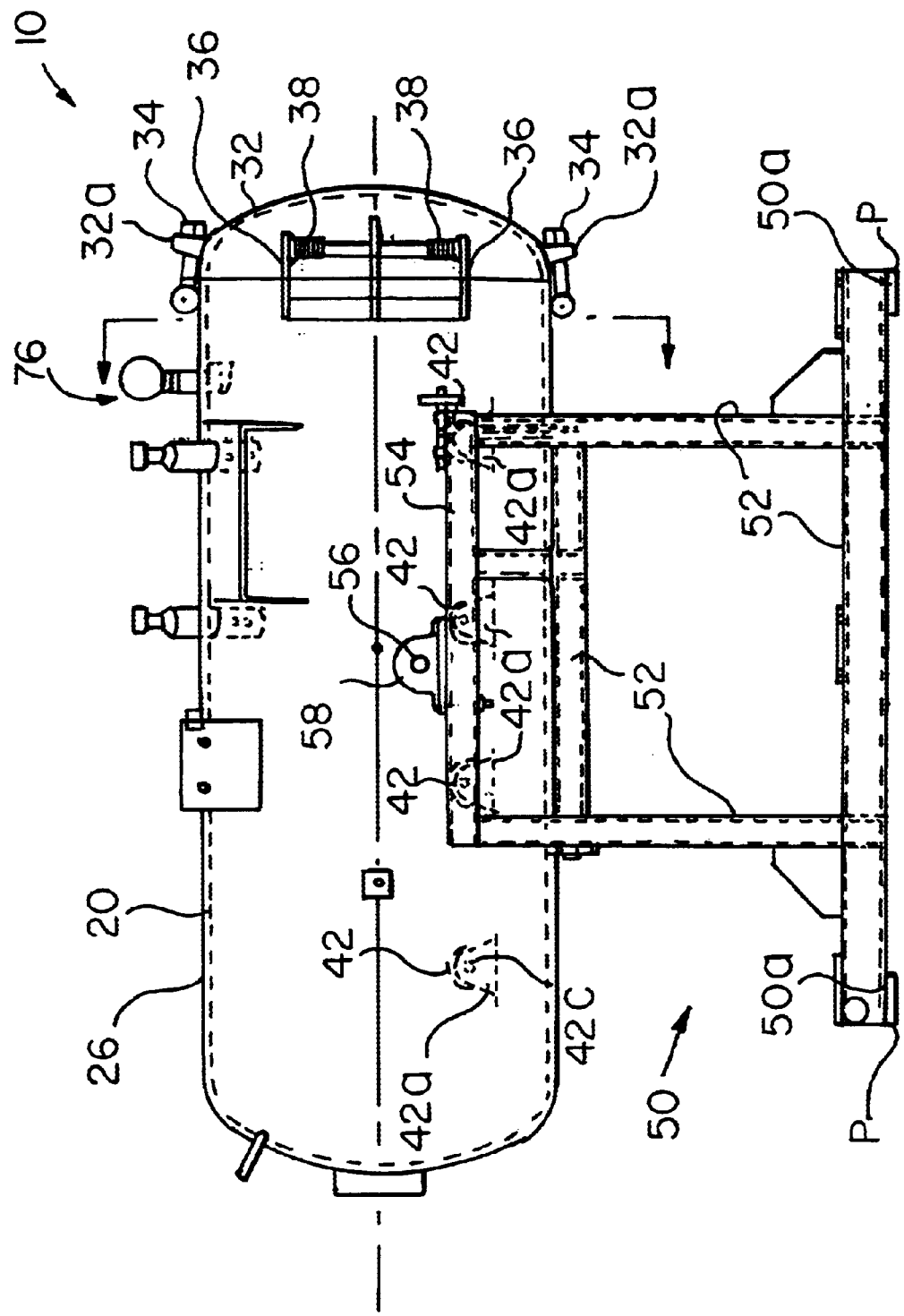
FIG. 1 is a side view of the inventive fluid substance containment and delivery apparatus showing the containment vessel mounted on the vessel support structure, with broken lines revealing the cylinder support rollers and roller projections.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Embodiments

Referring to FIGS. 1–6, an apparatus 10 is disclosed for safely delivering a toxic or otherwise hazardous fluid substance such as ammonia, sulphur dioxide, or chlorine, in gas or liquid form, from at least two supply cylinders 12 each having a release valve 16, to a distribution cylinder or process system 14. The word "fluid" in this application is understood to refer to both gaseous and liquid states. Chlorine gas transfer is an example followed throughout this description which is illustrative of the use of apparatus 10, but which should in no way be construed as limiting.

Apparatus 10 includes a high pressure capacity containment vessel 20 for receiving and safely enclosing first and second supply cylinders 12. Containment vessel 20 includes an integral cylindrical side and end wall 26 and a vessel lid 32 mounted on lid hinges 36. When vessel lid 32 is closed, it is secured and sealed to the rim 26a of vessel wall 26 by lid flanges 32a with bolts 34. See FIG. 4.

A containment vessel support structure is provided having a vessel pivot assembly so that the vessel can be tilted back, preferably to 45 degrees, causing liquid chlorine within the contained cylinders to flow to the bottom of the cylinders and away from cylinder release valves 16. The cylinders 12 are loaded into vessel 20 while vessel 20 is horizontal, but have to be oriented at an angle, such as to 45 degrees, to drain chlorine gas rather than liquid. Vessel supporting structure 50 includes a support frame 52 having parallel and laterally spaced apart frame side beams 54. See FIG. 1. One of the frame side beams 54 in FIG. 1 is located against the far side of vessel 20 and therefore not visible in this illustration. Vessel pins 56 are welded to the vessel 20 side wall and extend through pin bearings 58 bolted onto the top surfaces of frame side beams 54. A pair of lid biasing springs 38 bias lid 32 toward an open position to aid in opening the vessel lid 32 when the vessel 20 is tilted back at 45 degrees, and door sealing means are provided.

The vessel support structure 50 preferably also includes three electronic weight measuring scales 50a, one under each of three of the four vessel support structure 50 floor contact points P. The total weight of apparatus 10 is measured when containing empty first and second cylinders 12, and then when containing full cylinders 12, to provide a convenient way of determining when draining cylinders 12 are finally empty.

A supply cylinder support structure 40 is provided within containment vessel 20 including at least two parallel and longitudinally oriented cylinder support rails 41 mounted on a lower lateral cross-plate 44 welded at each end to vessel wall 26. A series of rollers 42 are mounted on roller axles 42c passing through support walls 42a within vessel 20 to support and permit each supply cylinder 12 to roll into vessel 20. Each cylinder support roller 42 preferably has two support points or roller mounts 42 and interconnecting channel bottom wall 42b. An upright plate 46 extends upwardly from the center of lower cross-plate 44 for separating first and second supply cylinders 12 from each other and an upper lateral cross-plate 48 extend horizontally from the upper ends of upright plate 46, so that the lower lateral cross-plate 44, upright plate 46 and upper lateral cross-plate 48 define a composite I-beam configuration. See FIGS. 1 and 3, for preferred roller and rail designs.

Two high pressure flex lines 22 extend from release valves 16 on respective supply cylinders 12 to corresponding vessel ports 24 in vessel wall 26, into each of which is mounted a gas sensing valve assembly 30. Rigid pipes and pipe fittings are optionally provided in place of flex lines 22, but are not preferred. Gas sensing valve assemblies 30 each automatically shuts off the flow of gas through its corresponding port 24 when a gas leak is detected outside containment vessel 20. Chlorine gas passes from its corresponding first or second supply cylinder 12 through a valve assembly 30 into a gas manifold 70 having coupling ports 72 to which a process system, or one or more distribution cylinders 14 are removably connected. Manifold 70 in this application is understood to include piping extending from the manifold. See FIGS. 5 and 5a.

A back-up, manually operated valve 68 is also provided on each valve assembly 30 for use in the event of a sensing valve assembly 30 malfunction. Sensing valve assembly 30 has a fail-safe-to-close design. The sensing and back-up valves, 30 and 68, respectively, and all adapters 74 have reduced orifice controllers for metering gas release. These reduced orifice controllers 66 permit a greatly reduced release rate of gaseous or liquid chlorine, so that a smaller scrubber unit 80 is adequate in the event of an accident. This reduced flow greatly reduces the worse-case release magnitudes. A pressure-vacuum gauge 76 is provided on containment vessel 20 to indicate to an operator when each supply cylinder 12 has been totally evacuated.

Gas manifold 70 is enclosed within an exhausted enclosure 76 having a sufficient internal volume to retain the certain quantity of gas contained within manifold 70 at substantially ambient temperature. Enclosure 76 is connected to a gas scrubbing unit 80 of sufficient capacity to safely and efficiently scrub this certain quantity of gas rapidly and the remainder of the ton of gas at a gradual rate. The vast majority of the gas is automatically sealed within each supply cylinder 12 by sensing valve assembly 30. A leak in one or both of the supply cylinders 12 empties gas into exhausted enclosure 76. This gas can be scrubbed at a low rate because it is safely contained, and can be discharged through the scrubbing unit 80 connected to exhausted enclosure 76. Should power failure deactivate scrubbing unit 80 during a gas leak, the most gas which could be released into the environment is that contained within manifold 70. This release is negligible in comparison with the prior art release of all the gas in a supply cylinder 12.

Means are provided for evacuating residual chlorine from lines of apparatus 10, including manifold 70. The preferred evacuating means is a vacuum disposal system (not shown) that removes all chlorine gas from the lines and disposes of the chlorine into a caustic disposal tank. Apparatus 10 can also lend itself to a purge system. Containment vessel 20 is evacuated through evacuation valve 82 in vessel wall 26.

At least two containment vessels 20 are preferably provided for alternative use, one being sized to receive two one ton supply cylinders 12 and the other sized to receive two fifteen- to twenty-pound cylinders 14. The latter is primarily intended to receive, contain and safely evacuate leaking cylinders 14. Both vessels 20 have reduced-orifice gas phase venting, as above indicated, and lids 32 secured to lid flanges 32a with bolts 34.

Gas sensing valve assembly 30 preferably includes a nitrogen powered, fail-safe-to-close automatic shut-off valve. See FIG. 6. This state-of-the-art, pneumatic-spring unit is designed to interface with multiple control points. The unit is connected to chlorine detectors and/or seismic sensors, and other alarms to provide for immediate chlorine shut off. The unit is hermetically sealed, and all components are NEMA-7. Each of the following events preferably activate the automatic shut-off: (1) gas detection, (2) remote location alarm in a facility housing apparatus 10, (3) failure of emergency power, (4) seismic activity, (5) failure of primary containment, (6) activation of manual fire alarm. A mechanical excess-flow shut-off valve 78 is connected to the ton supply cylinders 12 directly.

The exhausted enclosure 76 is combined with structural seismic support of conventional design directly connected to containment vessel 20. Stationary tanks and piping systems used for regulated materials are seismically braced in accordance with provisions of San Jose Building Code, Chapter 17.04, Title 17.78.310, Security.

Once again, it is to be understood that chlorine gas is merely one preferred fluid substance, of many gaseous and liquid substances, for delivery or transfer with apparatus 10.

Process

In practicing the invention, the following process may be practiced. The process includes the steps of placing at least two supply cylinders 12 into a containment vessel 20; connecting the supply cylinder 12 gas release valves 16 to respective flex lines 22 extending through the wall 26 of containment vessel 20 and through respective gas sensing valve assemblies 30. Additional steps optionally include delivery gas into gas manifold 70; evacuating the manifold 70 of residual liquid or gas; maintaining gas within supply cylinders 12 and within manifold 70 at ambient temperature so that gas pressure is minimized for safe retention; and delivering the gas from manifold 70 into at least one distribution cylinder 14 and scrubbing of the small amount of remaining gas.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for safely delivering a hazardous fluid substance to a receiving structure, comprising:

a plurality of supply cylinders containing said fluid substance and each said supply cylinder having a supply cylinder release port;

a high pressure containment vessel having a vessel wall and being sized to receive and safely enclose said plurality of supply cylinders;

multiple high pressure first tubing means, each extending from and in fluid communication with a corresponding one of said supply cylinder release ports and extending to and being in fluid communication with a vessel port in said vessel wall;

and a vessel valve in fluid communication with each of said first tubing means for controlling delivery of said fluid substance from said plurality of supply cylinders and from said vessel.

2. The apparatus of claim 1, additionally comprising a cylinder support structure within said containment vessel for supporting said plurality of supply cylinders and retaining said supply cylinders against substantial movement within said containment vessel and relative to each other.

3. The apparatus of claim 2, wherein said cylinder support structure comprise a lower lateral cross-plate within said containment vessel and at least two parallel and longitudinally oriented cylinder support rails mounted to said lower lateral cross-plate, said lateral cross-plate being secured at each end to said vessel wall, and a series of support rollers rotatably mounted to said cylinder support rails for supporting and permitting said supply cylinders to roll on said rollers into and out of said vessel.

4. An apparatus for safely delivering a hazardous fluid substance to a receiving structure, comprising:

first and second supply cylinders containing said fluid substance and each having a supply cylinder release port;

a high pressure containment vessel having a vessel wall and being sized to receive and safely enclose said first and second supply cylinders;

a high pressure first tubing means extending from each of said first and second supply cylinders and being in fluid communication with said supply cylinder release port and extending to and being in fluid communication with a vessel port in said vessel wall;

and a vessel valve in fluid communication with each of said first tubing means for controlling delivery of said fluid substance from said first and second supply cylinders and from said vessel.

5. The apparatus of claim 4, additionally comprising a cylinder support structure within said containment vessel for supporting said first and second supply cylinders and retaining said first and second supply cylinders against substantial movement within said containment vessel and relative to each other.

6. The apparatus of claim 5, wherein said cylinder support structure comprises a lower lateral cross-plate within said containment vessel and at least two parallel and longitudinally oriented cylinder support rails mounted to said lower lateral cross-plate, said lateral cross-plate being secured at each end to said vessel wall; and a series of support rollers rotatably mounted to said cylinder support rails for supporting and permitting said supply cylinders to roll on said rollers into and out of said vessel.

7. The apparatus of claim 1, wherein each said vessel valve comprises a fluid substance sensing valve assembly mounted in said vessel port, for automatically shutting off the flow of said fluid substance at said vessel port upon detection of said fluid substance outside said containment vessel, for automatically sealing substantially all said fluid substance contained within the corresponding said supply cylinder within said containment vessel in the event of an uncontrolled release of said fluid substance outside said containment vessel.

8. The apparatus of claim 1, additionally comprising:

at least one distribution cylinder;

wherein said receiving structure comprises a distribution manifold in fluid communication with said tubing means through which said fluid substance passes, having at least one coupling port to which said at least one distribution cylinder is removably connected, said manifold having a certain manifold internal volume for containing a certain quantity of said fluid substance; an exhausted enclosure enclosing said manifold and being of sufficient internal volume to retain at substantially ambient pressure and temperature said certain quantity of fluid substance contained within said manifold; and a fluid substance scrubbing unit of sufficient capacity to scrub all said fluid substance initially within said supply cylinder at a controlled flow rate through said vessel valve.

9. The apparatus of claim 4, wherein said vessel valve comprises reduced orifice controller means.

10. The apparatus of claim 4, additionally comprising a containment vessel support structure comprising a support frame having two substantially parallel and laterally spaced apart frame side beams, pin bearings secured onto tops of said frame side beams, vessel pins extending laterally from said vessel side wall and through said pin bearings, such that said vessel is pivotable relative to said frame on said vessel pins.

* * * * *